United States Patent [19]
Masumoto

[11] Patent Number: 5,963,710
[45] Date of Patent: Oct. 5, 1999

[54] METHOD AND APPARATUS FOR AUTOMATICALLY GENERATING INTERNAL REPRESENTATION

[75] Inventor: Daiki Masumoto, Kawasaki, Japan

[73] Assignee: Fujitsu Limited, Kawasaki, Japan

[21] Appl. No.: 08/829,797

[22] Filed: Mar. 27, 1997

[30] Foreign Application Priority Data

Sep. 13, 1996 [JP] Japan ................................. 8-243530

[51] Int. Cl.$^6$ .......................... G05B 15/00; G05B 13/04
[52] U.S. Cl. ................................ 395/94; 395/80; 395/92; 395/93; 359/144; 364/151
[58] Field of Search ................................. 395/80, 92, 93, 395/94; 359/144; 706/6, 16; 364/151

[56] References Cited

U.S. PATENT DOCUMENTS

| | | | |
|---|---|---|---|
| 5,319,443 | 6/1994 | Watanabe et al. | 356/375 |
| 5,414,619 | 5/1995 | Katayama et al. | 364/151 |
| 5,477,825 | 12/1995 | Hattori et al. | 123/399 |
| 5,498,943 | 3/1996 | Kimoto et al. | 318/601 |

FOREIGN PATENT DOCUMENTS

| | | |
|---|---|---|
| 61-149819 | 7/1986 | Japan . |
| 7-080790 | 3/1995 | Japan . |

OTHER PUBLICATIONS

Nagata et al., "Hierarchical Sensory–Motor Fusion Model with Neural Networks", *Japan Robot Society Journal*, vol. 12, No. 5, 1994, pp. 685–694.

Kawato, Mitsuo, "Motor Learning in the Brain", *Japan Robot Society Journal*, vol. 13, No. 1, 1995, pp.11–19.

*Primary Examiner*—William Grant
*Assistant Examiner*—Peter W. Eissmann
*Attorney, Agent, or Firm*—Staas & Halsey

[57] ABSTRACT

An apparatus automatically generates internal representations in a recognition and control system which is capable of actively varying a state of a subject, such an object and a related environment, to be processed by the recognition and control system, a state of the recognition and control system itself, or a relationship between the subject and the recognition and control system. The apparatus includes a sensor detecting a state of the recognition and control system and outputting a sensor signal, an actuator varying the state of the recognition and control system in response to a control signal, a sensory module processing the sensor signal from the sensor and outputting a sensory signal, a motor module generating and outputting the control signal which controls the actuator, based on a motor signal or a motor command, and an automatic adjusting module analyzing a mutual dependency relationship between the sensor signal and the control signal, based on the sensory signal from the sensory module and the control signal from the motor module, to obtain the analysis results, and automatically adjusting sensory characteristic of the sensory module and motor characteristic of the motor module, based on the analysis results, so that sensory information and motor information, which are internal representations of the sensor signal and the control signal, are automatically generated.

18 Claims, 18 Drawing Sheets

SPACE OF SENSORY SIGNAL

SPACE OF SENSORY SIGNAL

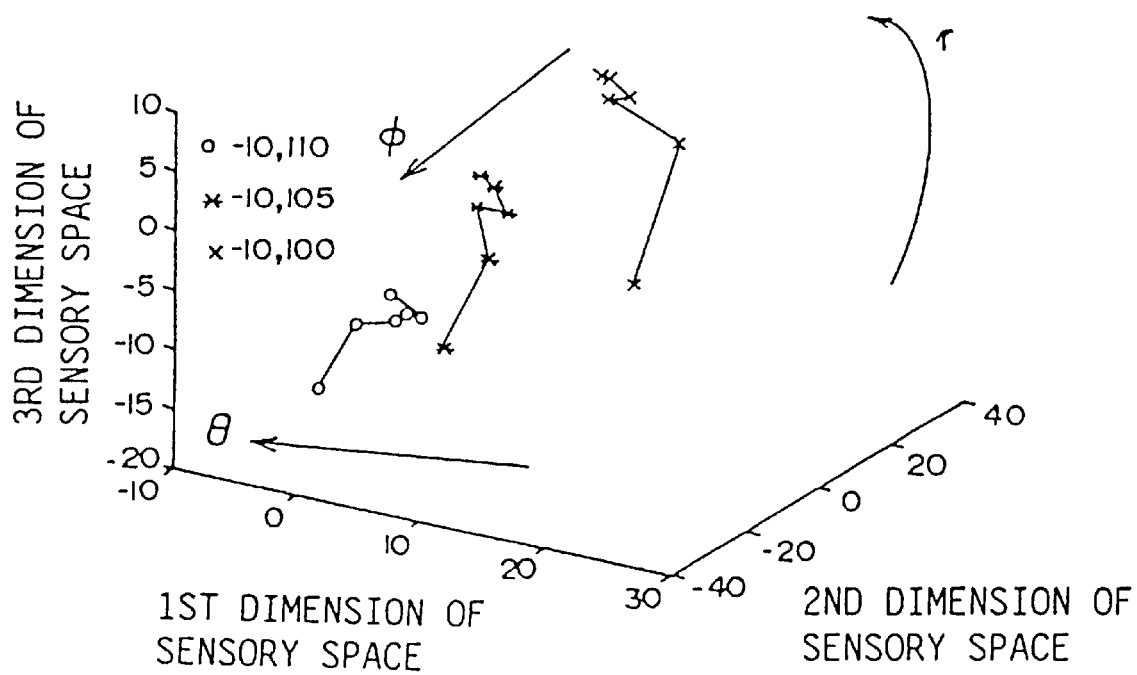

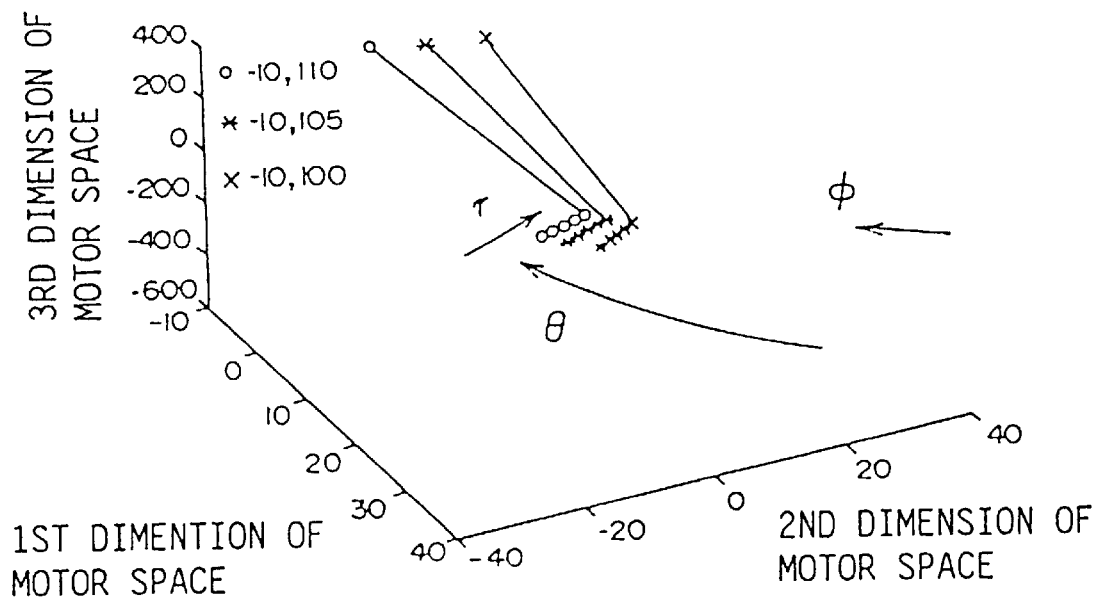

METHOD AND APPARATUS FOR AUTOMATICALLY GENERATING INTERNAL REPRESENTATION

BACKGROUND OF THE INVENTION

The present invention generally relates to methods and apparatuses for automatically generating internal representations, and more particularly to a method and apparatus for automatically generating appropriate internal representations of sensory information and motor information by automatically adjusting a sensory module characteristic and a motor module characteristic based on analysis results of a mutual dependency relationship between the sensory information and the motor information within a recognition and control system, where a state of a subject such as an object and environment, a state of the recognition and control system itself or, the relationship between the subject and the recognition and control system can be varied actively.

In this specification, the "internal representation" indicates sensory information such as sensor signals within the system and motor information such as control signals. In addition, the "recognition and control system" includes various kinds of robots, recognition systems, inspection systems, navigation systems for autonomous locomotion units or self-contained control units, tracking systems and the like, for example.

Conventionally, in order to make a robot carry out an operation, for example, a person first analyzes the operation, and a programming is made by assembling methods suited for the robot based on the results of the analysis. The robot which is programmed in this manner carries out the desired operation by executing the program.

The application range of the conventional robot is relatively limited because of the large restriction related to the operating environment and the operation content. For this reason, in order to increase the application range of the robot, it is necessary for the robot to have the capability of carrying out various kinds of tasks under various situations. However, it is extremely difficult for the person who designs the robot to predict in advance all of the possible situations the robot may face and to program the robot in advance to have the capability of coping with all of the predicted situations. The prediction of the possible situations and the programming of the robot are particularly difficult when the robot must carry out various tasks.

Accordingly, it is desirable for the robot to interact with the environment and to learn its behavior by itself, depending on the situation and the object of the task. It is possible to increase the application range of the robot if it becomes possible to carry out various kinds of tasks under various situations and to improve the operation efficiency thereof by such a self-learning process.

In order to realize a robot having the above described self-learning function, a low level learning process which stores a moving locus that is taught and, reproduces the stored moving locus, for example, is insufficient, and it is necessary to also carry out a high level learning process which can learn at the task level. But the conventional learning process at the task level in most cases simply carries out a computer simulation in an ideal environment, and not much consideration is given as to the application to the actual robot. The "ideal environment" indicates a world on a plane which is sectioned into lattices, for example. In the world on such a plane, a "state" corresponds to a lattice coordinate where the robot is located, and a "motor" (or "motion") corresponds to a movement from one lattice to another adjacent lattice above, below, to the right or left. In the ideal environment, the motor information of the robot and the state transition correspond one-to-one. In addition, since the levels of the state space and the motor space are low, it is possible to make the robot learn the behaviors for carrying out the task by carrying out a reinforcement learning process or the like.

However, the actual robot is not used in the ideal environment, and for this reason, there was a problem in that it is extremely difficult to form appropriate state space and motor space. In other words, it was extremely difficult to make the actual robot learn at the task level unless problems, such as how to represent the extremely large amount of sensory information in a compact state space and how to form a motor space that would correspond to the state space, are solved.

That is, an important problem to be solved in order to realize a recognition and control system was to generate appropriate internal representations of sensory information and control information of the recognition and control system.

SUMMARY OF THE INVENTION

Accordingly, it is a general object of the present invention to provide a novel and useful method and apparatus for automatically generating appropriate internal representations of sensory information and motor information, in which the problems described above are eliminated.

Another and more specific object of the present invention is to provide a method and apparatus for automatically generating appropriate internal representations of sensory information and motor information by automatically adjusting a sensory module characteristic and a motor module characteristic based on analysis results of a mutual dependency relationship between the sensory information and the motor information within a recognition and control system, where a state of a subject such as an object and environment, a state of the recognition and control system itself or, the relationship between the subject and the recognition and control system can be varied actively.

Still another object of the present invention is to provide an apparatus for automatically generating internal representations in a recognition and control system which is capable of actively varying a state of a subject such as an object and environment to be processed by the recognition and control system, a state of the recognition and control system itself or, a relationship between the subject and the recognition and control system, which apparatus comprises sensor means for detecting a state of the recognition and control system and outputting a sensor signal, actuator means for varying the state of the recognition and control system in response to a control signal, a sensory module outputting a sensory signal by processing the sensor signal from the sensor means, a motor module outputting the control signal which controls the actuator means based on a motor signal or a motor command, and an automatic adjusting module analyzing a mutual dependency relationship between the sensor signal and the control signal based on the sensory signal from the sensory module and the control signal from the motor module to obtain analysis results, and automatically adjusting sensory characteristic of the sensory module and motor characteristic of the motor module based on the analysis results, so that sensory information and motor information which are internal representations of the sensor signal and the control signal are automatically generated.

According to the apparatus of the present invention, it is possible to automatically generate appropriate internal representations for efficiently recognizing and controlling the state of the subject, the state of the recognition and control system itself or, the relationship between the subject and the recognition and control system.

A further object of the present invention is to provide a computer-implemented method of automatically generating internal representations in a recognition and control system which is capable of actively varying a state of a subject such as an object and environment to be processed by the recognition and control system, a state of the recognition and control system itself or, a relationship between the subject and the recognition and control system, which method comprises the steps of (a) detecting a state of the recognition and control system and outputting a sensor signal, (b) varying the state of the recognition and control system in response to a control signal, (c) outputting a sensory signal by processing the sensor signal, (d) outputting the control signal which controls the actuator means based on a motor signal or a motor command, and (e) analyzing a mutual dependency relationship between the sensor signal and the control signal based on the sensory signal and the control signal to obtain analysis results, and automatically adjusting sensory characteristic of the step (c) and motor characteristic of the step (d) based on the analysis results, so that sensory information and motor information which are internal representations of the sensor signal and the control signal are automatically generated. According to the method of the present invention, it is possible to automatically generate appropriate internal representations for efficiently recognizing and controlling the state of the subject, the state of the recognition and control system itself or, the relationship between the subject and the recognition and control system.

Other objects and further features of the present invention will be apparent from the following detailed description when read in conjunction with the accompanying drawings.

BRIEF DESCRIPTION OF THE DRAWINGS

FIGS. 10A, 10B and 10C respectively are diagrams showing a space of a sensory signal generated by the sensory-motor fusion learning;

FIGS. 11A, 11B and 11C respectively are diagrams showing a space of a motor signal (or motor command) generated by the sensory-motor fusion learning;

DESCRIPTION OF THE PREFERRED EMBODIMENTS

A recognition and control system such as a robot must obtain sensory information using various kinds of sensors while behaving in a manner depending on an object of a task, and recognize a situation surrounding the system and an achievement rate of the task. For this reason, it is necessary to provide a mechanism for calculating an interaction of the recognition and behavior, that is, the effects of the behavior on the recognition and the effects of the recognition on the behavior. In the following description, a mechanism which calculates an interaction of sensory information and control information will be referred to as a "module".

In addition, it is necessary to realize a processing structure which fuses different kinds of sensory information while transforming the different kinds of sensory information into the same kind of information in steps.

Accordingly, the present inventor studied a hierarchical sensory-motor fusion model which includes a mechanism for calculating an interaction of sensory information and motor information at each level, and has a processing structure which fuses different kinds of sensory information.

Figure 1:
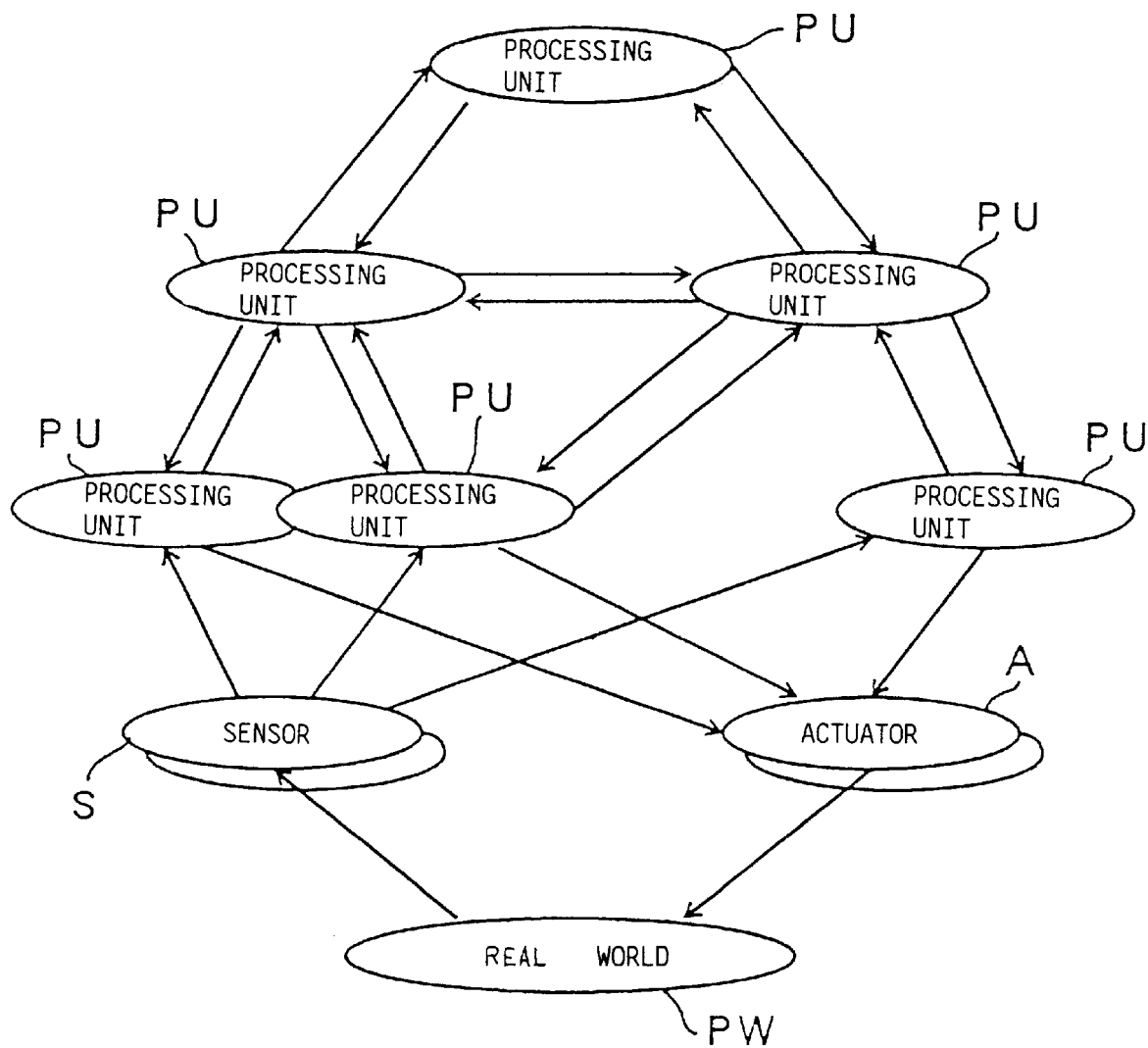
FIG. 1 is a diagram showing the general structure of a hierarchical sensory-motor fusion model.

FIG. 1 shows the general construction of the hierarchical sensory-motor fusion model. In this mode, a plurality of self-contained processing units PU are coupled hierarchically on a real world PW, that is, on a sensor group S which inputs information of an external world and an actuator group A which act on the external world. Bidirectional information exchange is realized among the processing units PU in a bottom-up and top-down manner.

Figure 2:
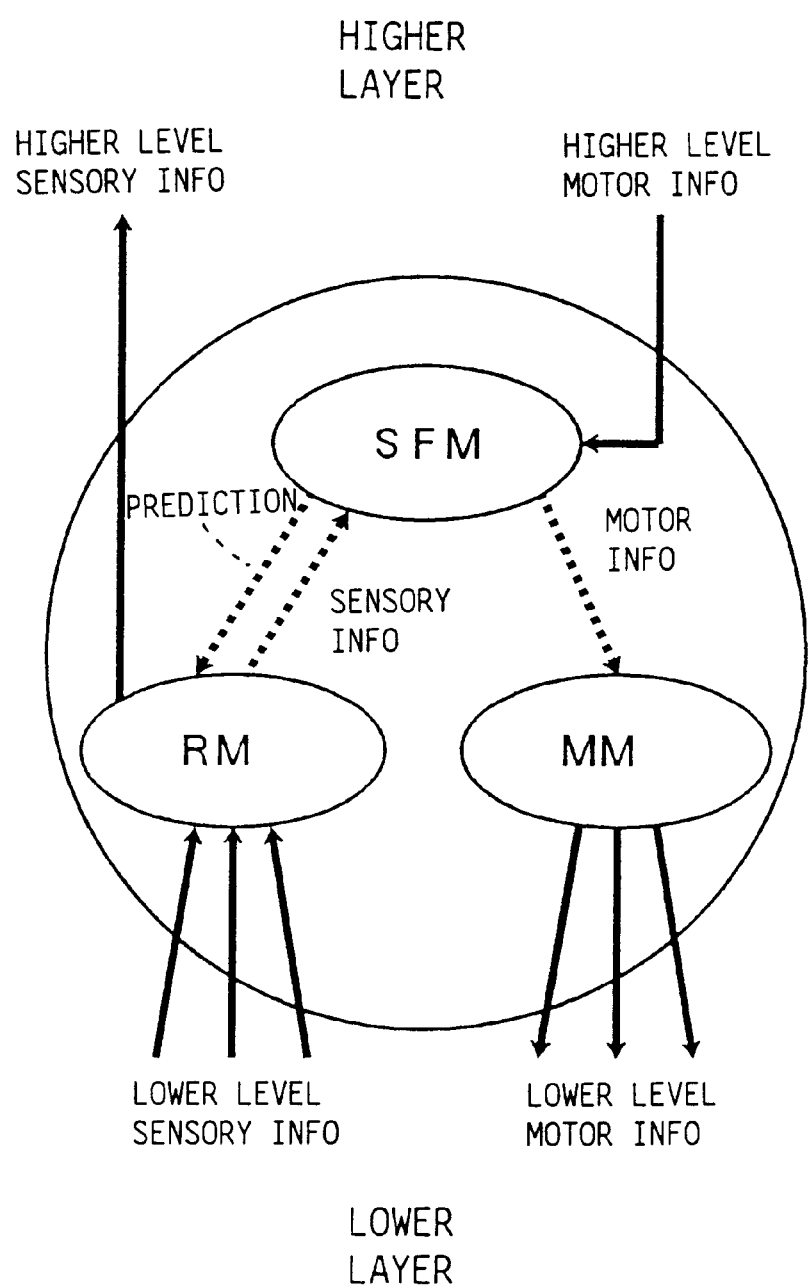
FIG. 2 is a diagram showing the construction of a processing unit.

As shown in FIG. 2, each processing unit PU is made up of three modules, namely, a recognition (or sensory) module RM, a motor module MM, and a sensory-motor fusion module SFM which links the recognition module RM and the motor module MM. The recognition module RM transforms sensory information that is collected in time space and is obtained from a lower level (or sensor group S) into sensory information having a higher abstraction, and transmits this transformed sensory information to a higher level. On the other hand, the motor module MM transforms motor information that is obtained from a higher level into more particular motor information of a lower level (or actuator group A), and acts on the external world by transmitting this transformed motor information to the lower level. The sensory-motor fusion module SFM links the recognition module RM and the motor module MM. More particularly, the sensory-motor fusion module SFM predicts a change in the sensory information introduced by the action of the motor module MM on the external world, and notifies the predicted change to the recognition module RM. In addition, based on the sensory information that is detected and recognized by the recognition module RM and the motor information obtained from the higher level, the sensory-motor fusion module SFM generates motor information by time-division of the motor information which is with respect to the motor module MM and is obtained from the higher level.

According to the hierarchical sensory-motor fusion mode, the task given to the highest level is transmitted to each of the processing units PU in divisions in time space as a particular target behavior, that is, as motor information to be executed by the lower level. Therefore, the object of the task can be achieved because the plurality of processing units PU operate in a self-contained and cooperative manner towards achieving individual targets.

Next, a description will be given of the sensory-motor fusion module SFM which is a mechanism for calculating the interaction of the sensory information and the motor information.

Figure 3:
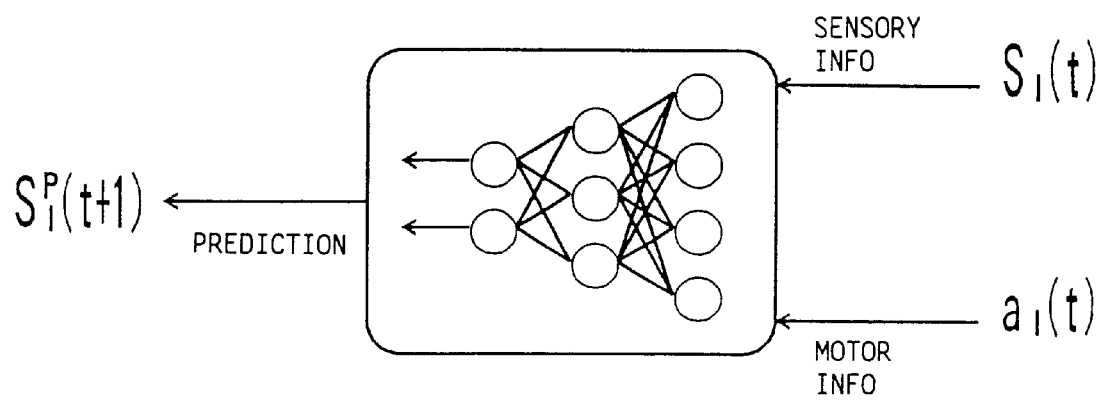
FIG. 3 is a diagram showing the construction of a sensory-motor fusion module.

FIG. 3 shows the construction of the sensory-motor fusion module SFM as formed by a multi-level neural network and which acquires the corresponding relationship of sensory information $s_1(t)$ and motor information $a_1(t)$ at the present time and sensory information $s_1(t+1)$ at the next time based on an error back-propagation learning, where t denotes a time step in the concerned level. When this network carries out a forward process, it is possible to generate a predicted value $s_1^P(t+1)$ of the sensory information at the next time. The sensory-motor fusion module SFM also has a function of generating the motor information $a_1(t)$, but since the generation of the motor information $a_1(t)$ is not directly related to the subject matter of the present invention, a description thereof will be omitted in this specification.

When forming the sensory-motor fusion module SFM, it is unrealistic to input and process all sensory information and all motor information of the recognition and control system as they are in the sensory-motor fusion module SFM. This is because an extremely large amount of training data becomes necessary in order to learn mapping among high-dimensional spaces, and an extremely long time is required for the training.

Hence, in order to form the sensory-motor fusion module SFM at a high speed using a small number of teaching data, the present inventor conceived using the sensory information and the motor information which have the following natures (A) and (B).

(A) The mutual dependency relationship between the sensory information and the motor information is non-uniform, and has some kind of a structure.

(B) The sensory information and the motor information have redundant portions.

First, utilization of the nature (A) is considered. If a related structure is automatically extracted, a pair of sensory information and motor information having a strong relationship is obtained and a sensory-motor fusion module is prepared independently for each pair, it is possible to distribute the load with respect to a processor which carries out the processing. In addition, if it is possible to obtain a hierarchical structure from the relationship between the sensory information and the motor information, it is possible to realize an effective processing which makes good use of the hierarchical structure.

Second, utilization of the nature (B) is considered. When the relationship of the sensory information and the motor information is considered, there are redundant portions in the sensory information and the motor information. For example, sensory information which does not change in response to the motor (motion) is redundant, and motor information which does not contribute to the change in the sensory information is also redundant. If such redundancy can be eliminated, it is possible to represent the relationship in a low-dimensional space.

By utilizing the above described natures (A) and (B), it should be possible to generate a compact representation satisfactorily representing the mutual dependency relationship between the sensory information and the motor information. A method of generating such a compact representation will be referred to as a sensory-motor fusion learning method as described hereunder.

The sensory-motor fusion learning method is a kind of teacherless learning. The "teacherless learning" is employed when a target output is unknown, and is capable of extracting structure from date and eliminating redundancy.

Figure 4:
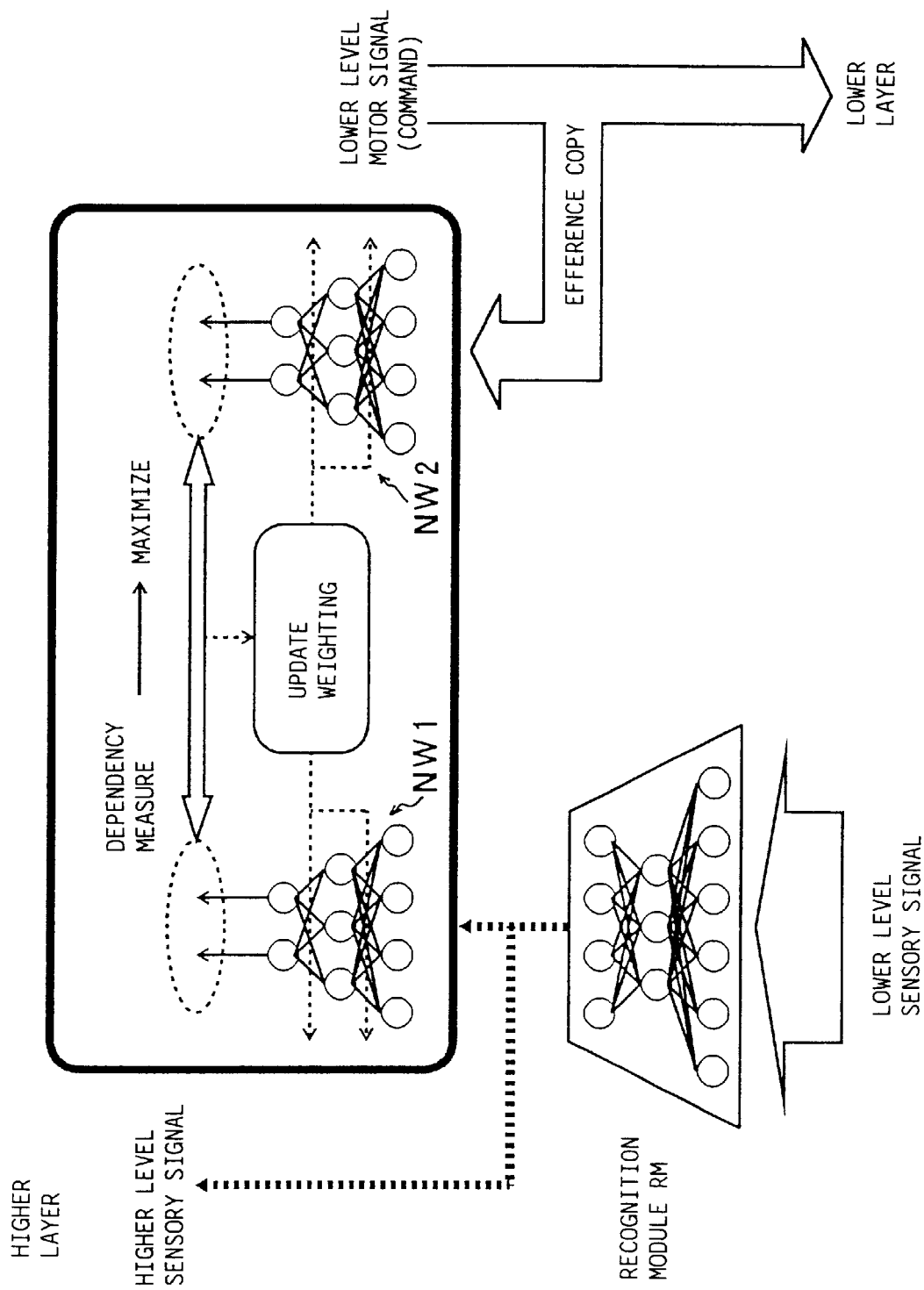
FIG. 4 is a diagram for explaining the process flow of a sensory-motor fusion learning method.

A process flow of the sensory-motor fusion learning method will be described with reference to FIG. 4. The recognition module RM transforms the sensory information which are collected in the time space and obtained from the lower level (or sensor group S) into sensory information having a higher abstraction. An output of the recognition module RM is transmitted to a higher level as higher dimensional sensory information, and at the same time, the output of the recognition module RM is input to a network NW1 shown on the top left in FIG. 4. On the other hand, the motor information is transmitted to a lower level, and at the same time, a branched efference copy is input to a network NW2 shown on the top right in FIG. 4. By repeating the above described operation, the weighting is updated so as to maximize a dependency measure of the mutual dependency relationship between the outputs of the networks NW1 and NW2. As the dependency measure of the mutual dependency relationship, there is amount of mutual information that can measure the general mutual dependency relationship, a moment correlation coefficient that measures linear mutual dependency relationship, and the like.

In the case where the moment correlation coefficient is used as the dependency measure and a network which carries out a linear transformation is employed, the sensory-motor fusion learning method becomes equivalent to canonical correlation analysis. The canonical correlation analysis is a kind of multivariate data analysis technique. As will be described later, the canonical correlation analysis is used to compress the dimension of information from a plurality of information sources so as to best represent the correlation structure among the information.

For the sake of convenience, it will be assumed that a sensory signal indicating the sensory information is denoted by a p-dimensional vector $s(t)=\{s_1(t), s_2(t), \ldots, s_p(t)\}^T$, a motor signal (or command) indicating the motor information is denoted by a m-dimensional vector $a(t)=\{a_1(t), a_2(t), \ldots, a_m(t)\}^T$, and the p-dimensional vector $s(t)$ and the m-dimensional vector $a(t)$ are generated at discrete times $t=1, \ldots, N$.

Figure 5:
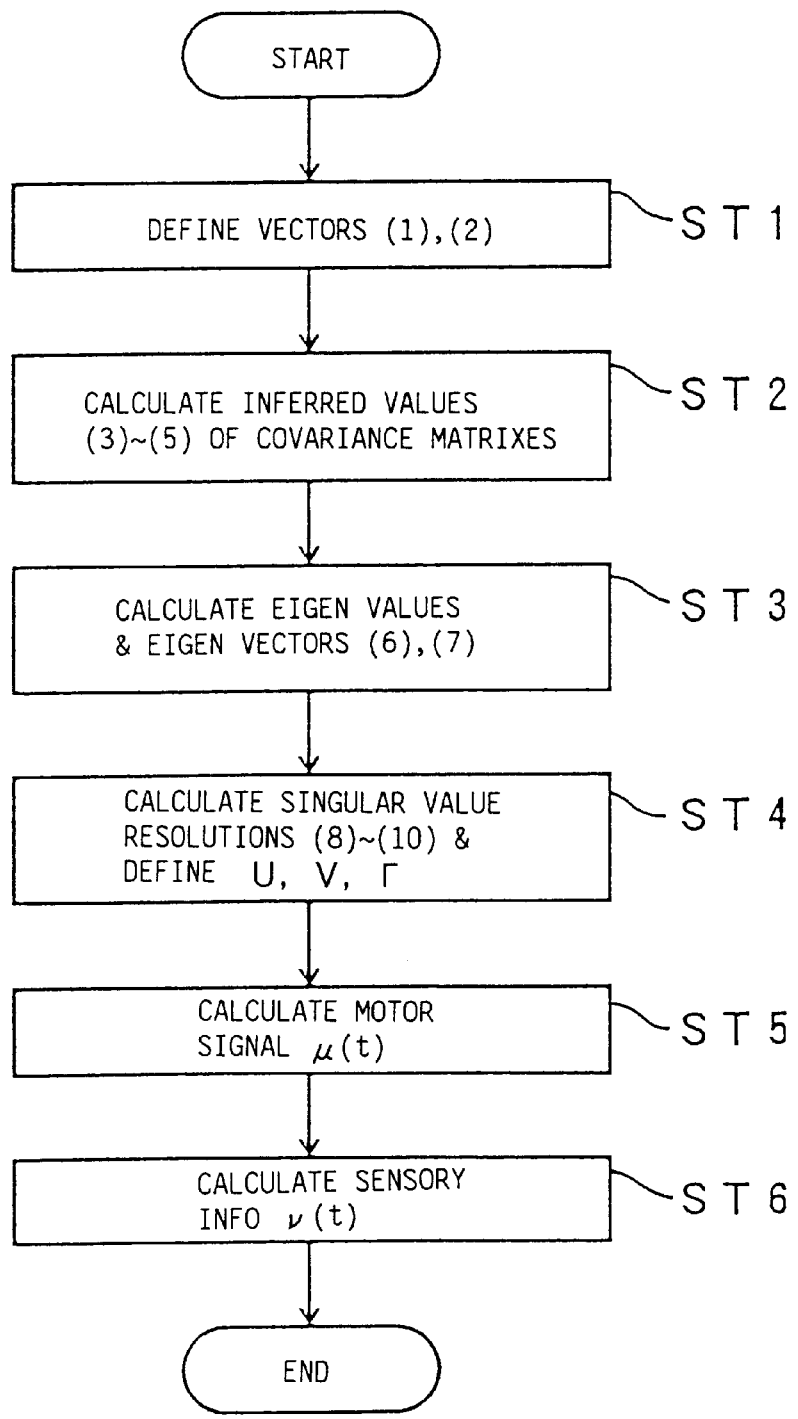
FIG. 5 is a flow chart for explaining the sensory-motor fusion learning method.

FIG. 5 is a flow chart for explaining the sensory-motor fusion learning method. In a first step ST1 shown in FIG. 5, vectors are defined by the following formulas (1) and (2).

$$p(t)=(a^T(t-1), a^T(t-2), a^T(t-3), \ldots, a^T(t\text{-}l))^T \quad (1)$$

$$f(t)=(s^T(t), s^T(t+1), s^T(t+2), \ldots, s^T(t+k-1))^T \quad (2)$$

By the above definitions, $p(t)$ is a lm-dimensional vector, and $a(t)$ is a kp-dimensional vector. In the following description, it is assumed that data $\{(a(t), s(t))|t=1, \ldots, N\}$ is given, where $N':=N-k-l+1$, $l':=l(p+m)$, and $k':=kp$.

In a second step ST2, inferred values of covariance matrixes shown by the following formulas (3) through (5) are calculated based on the given data, where it is assumed that average values of p(t) and f(t) are eliminated in advance.

$$\sum_{pp} = (1/N') \sum_{t=l+1}^{N-k+1} p(t)p^T(t) \quad (3)$$

$$\sum_{ff} = (1/N') \sum_{t=l+1}^{N-k+1} f(t)f^T(t) \quad (4)$$

$$\sum_{pf} = (1/N') \sum_{t=l+1}^{N-k+1} p(t)f^T(t) \quad (5)$$

In a third step ST3, eigen values and eigen vectors of $\Sigma_{pp}$ and $\Lambda = \Sigma_{ff}$ are obtained, and the following formulas (6) and (7) are calculated. However, the calculation of $U_2$ and $S_2$ is unnecessary if $\Lambda = \Sigma_{ff} = I_{k'}$.

$$\Sigma_{pp}^{-\frac{1}{2}} = U_1 S_1^{-\frac{1}{2}} U_1^T \quad (6)$$

$$\Lambda^{-\frac{1}{2}} = U_2 S_2^{-\frac{1}{2}} U_2^T \quad (7)$$

In a fourth step ST4, singular value resolutions of the following formulas (8) through (10) are calculated.

$$\Sigma_{pp}^{-\frac{1}{2}} \Sigma_{pf} \Lambda^{-\frac{1}{2}} = U_3 S_3 V_3^T \quad (8)$$

$$U_3 U_3^T = T_{l'} \quad (9)$$

$$V_3 V_3^T = I_{k'} \quad (10)$$

In addition, U, V and Γ are defined as shown in the following formulas (11) through (13).

$$U := U_3^T \Sigma pp^{-\frac{1}{2}} \quad (11)$$

$$V := V_3^T \Lambda^{-\frac{1}{2}} \quad (12)$$

$$\Gamma := S_3 \quad (13)$$

In a fifth step ST5, a motor signal $\mu(t)$ is calculated based on the following formula (14), where a n×n unit matrix is denoted by $I_n$, n denotes the dimension of the motor signal satisfying $n \leq \min(l', k')$, and $\mu(t)$ is obtained by contracting information of the data p(t) and indicates the motor signal at a time t.

$$\mu(t) = [I_n 0] U p(t), \; t=l+1, \ldots, N-k+1 \quad (14)$$

In a sixth step ST6, sensory information v (t) is calculated based on the following formula (15), where a n×n unit matrix is denoted by $I_n$, and v(t) is obtained by contracting information of the data f(t) and indicates the sensory signal at the time t.

$$v(t) = [I_n 0] V f(t), \; t=l+1, \ldots, N-k+1 \quad (15)$$

It is possible to generalize the algorithm so as to permit a general non-linear transformation by eliminating the restriction of the linear transformation. However, at the present time, this generalized algorithm can only treat a problem of a relatively low dimension, and for this reason, the present invention only treats the canonical correlation analysis as the sensory-motor fusion learning.

Figure 6:
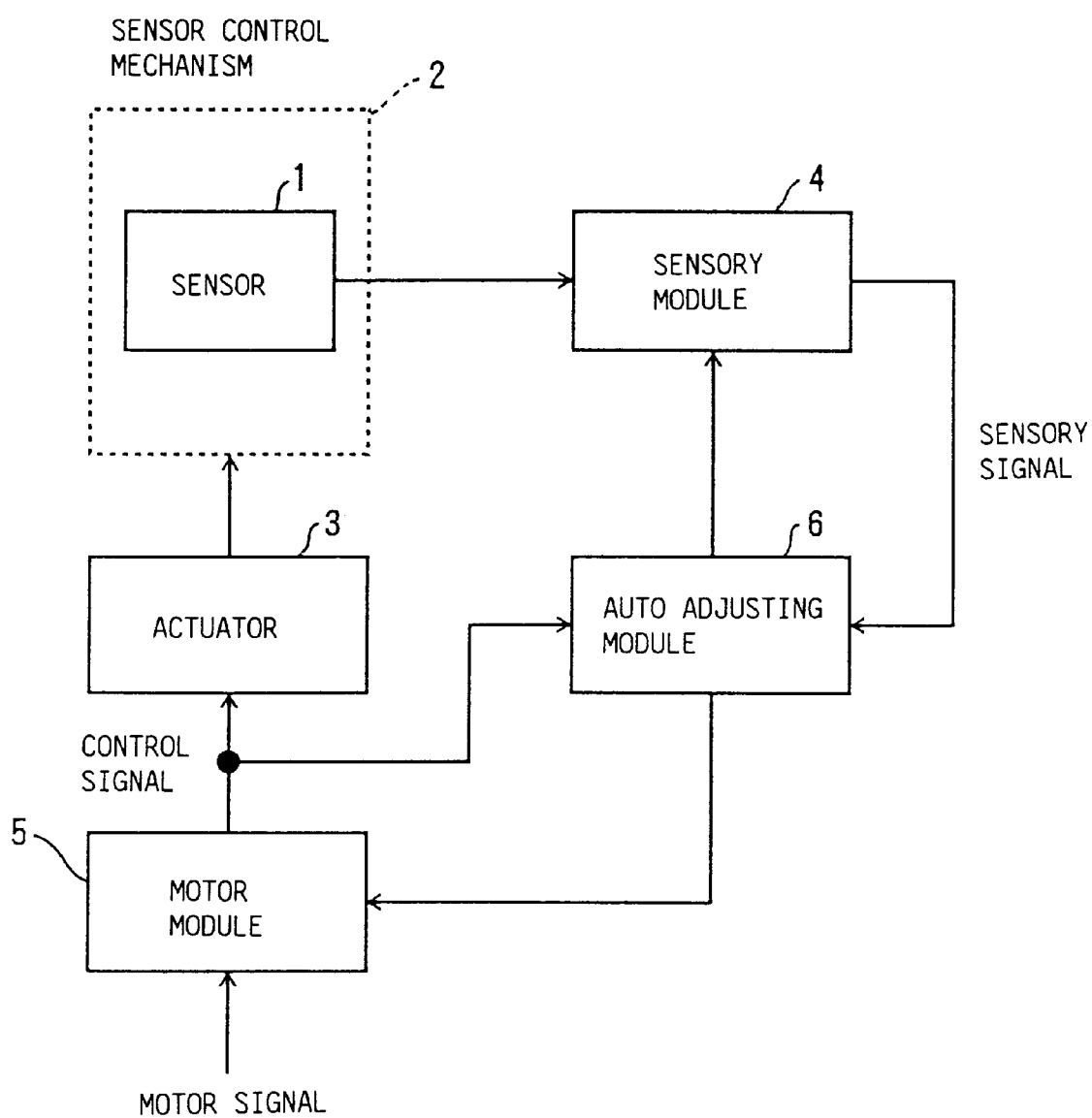
FIG. 6 is a system block diagram showing the construction of a part of an embodiment of an apparatus for automatically generating internal representations according to the present invention.

FIG. 6 shows a part of an embodiment of an apparatus for automatically generating internal representations according to the present invention. In this embodiment of the apparatus, the present invention is applied to a robot, and this embodiment of the apparatus employs an embodiment of a method of automatically generating internal representations according to the present invention.

In FIG. 6, a sensor 1 is supported on a sensor control mechanism 2, and outputs a sensor signal by detecting a certain state of the robot. For example, the sensor 1 is made up of a position sensor which detects a position of a robot arm (not shown), a velocity sensor which detects acceleration or the like of the robot arm, a temperature sensor, a humidity sensor, an illumination sensor, a camera mounted on the robot arm, or the like. An actuator 3 is provided as a driving means for driving the robot arm or the like. In this embodiment, the actuator 3 drives the sensor control mechanism 2 so as to control the position or the like of the sensor 1. In a case where the sensor 1 is made up of a camera, the sensor control mechanism 2 includes a mechanism for controlling the focal distance, lens stop, resolution and the like of the camera, and at least one of the focal distance, lens stop, resolution and the like is controlled when the sensor control mechanism 2 is driven by the actuator 3. In other words, the actuator 3 can vary characteristic parameters such as the sensitivity and resolution of the sensor 1 via the sensor control mechanism 2, and it is therefore possible to actively vary the state of a target (object or environment) which is to be processed by the robot, the state of the robot itself or, the relationship between the state of the target and the state of the robot itself.

In actual practice, a plurality of sensors 1, sensor control mechanisms 2 and actuators 3 are provided on the robot. However, only one sensor 1, one sensor control mechanism 2 and one actuator 3 are shown in FIG. 6 for the sake of convenience.

A sensory module 4 corresponds to the recognition module RM described above. The sensory module 4 processes the sensor signal from the sensor 1 and outputs a sensory signal. A motor module 5 corresponds to the motor module MM described above. The motor module 5 outputs a control signal which controls the actuator 3 based on a motor signal or a motor command. The sensory signal from the sensory module 4 and the control signal from the motor module 5 are also input to an automatic adjusting module 6. The automatic adjusting module 6 analyzes the mutual dependency relationship between the sensor signal and the control signal so as to efficiently recognize and control the state of the target to be processed by the robot, the state of the robot itself or, the relationship between the state of the target and the state of the robot itself, and automatically adjusts the characteristic of the sensory module 4 and the motor characteristic of the motor module 5 based on the results of the analysis. Hence, the automatic adjusting module 6 can automatically generate appropriate internal representations of the sensor signal and the control signal, that is, appropriate sensory information and motor information, by automatically adjusting the characteristic of the sensory module 4 and the motor characteristic of the motor module 5 based on the results of the analysis.

Figure 7:
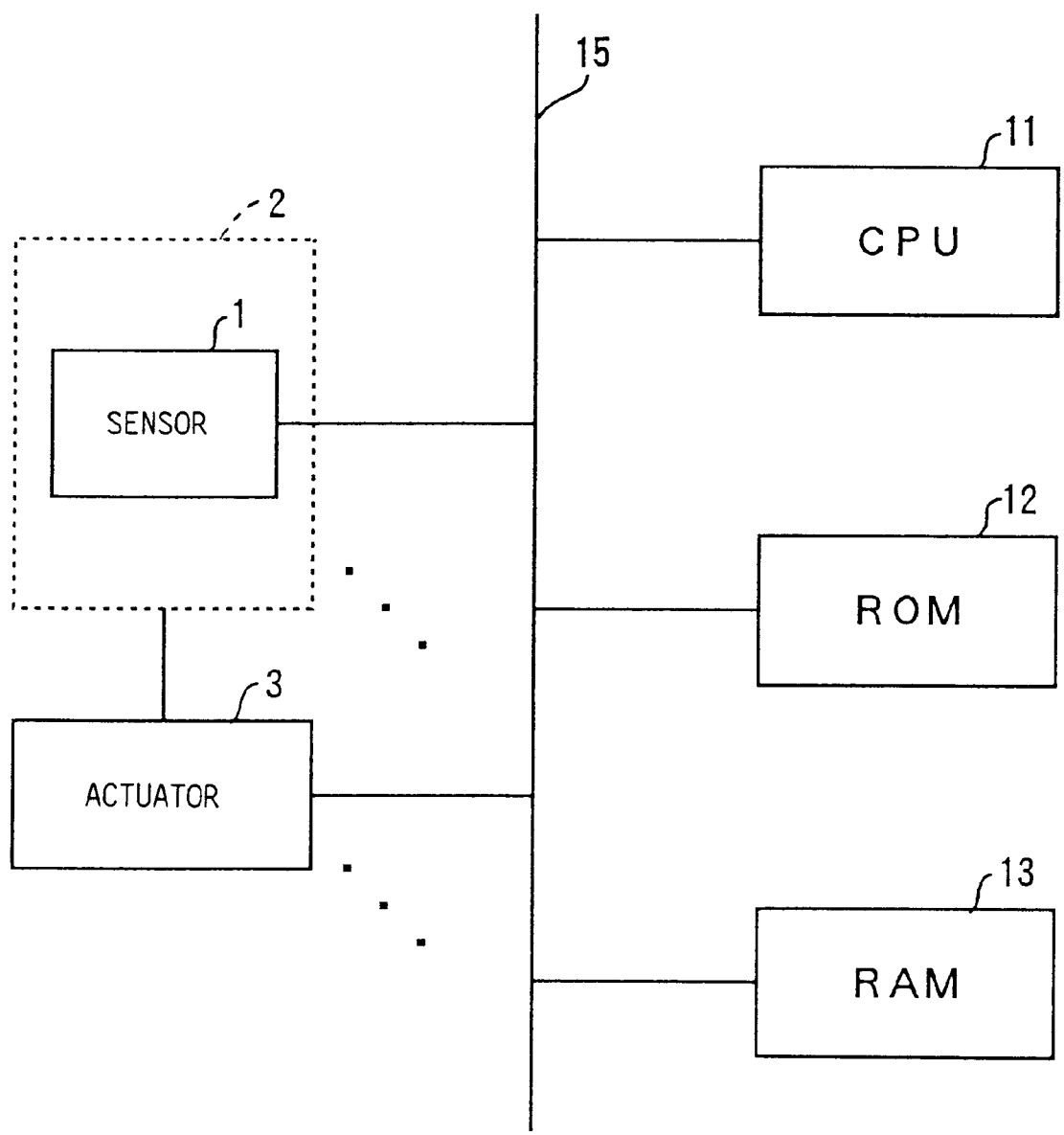
FIG. 7 is a system block diagram for explaining the operations of a sensory module, a motor module and an automatic adjusting module.

FIG. 7 shows a block diagram for explaining the operations of the sensory module 4, the motor module 5 and the automatic adjusting module 6 shown in FIG. 6. In other words, FIG. 7 shows a more concrete structure of this embodiment.

In FIG. 7, a central processing unit (CPU) 11, a ROM 12, a RAM 13, a plurality of sensors 1 (only one shown), and a plurality of actuators 3 (only one shown) are coupled via a bus 15. The CPU 11 carries out the operations of the sensory module 4, the motor module 5 and the automatic adjusting module 6. The ROM 12 stores data and programs to be executed by the CPU 11. The RAM 13 stores intermediate data and the like when the CPU 11 executes the program. Of course, a storage means used by the CPU 11 is not limited to the ROM 12 and the RAM 13, and other storage means may be used as long as programs and data are storable in the storage means.

The CPU 11 carries out the steps ST1 through ST6 shown in FIG. 5 to analyze the mutual dependency relationship between the sensor signal and the control signal so as to efficiently recognize and control the state of the target to be processed by the robot, the state of the robot itself or, the relationship between the state of the target and the state of the robot itself, and automatically adjusts the characteristic of the sensory module 4 and the motor characteristic of the motor module 5 based on the results of the analysis to automatically generate the appropriate internal representations of the sensor signal and the control signal, that is, the appropriate sensory information and motor information.

Figure 8:
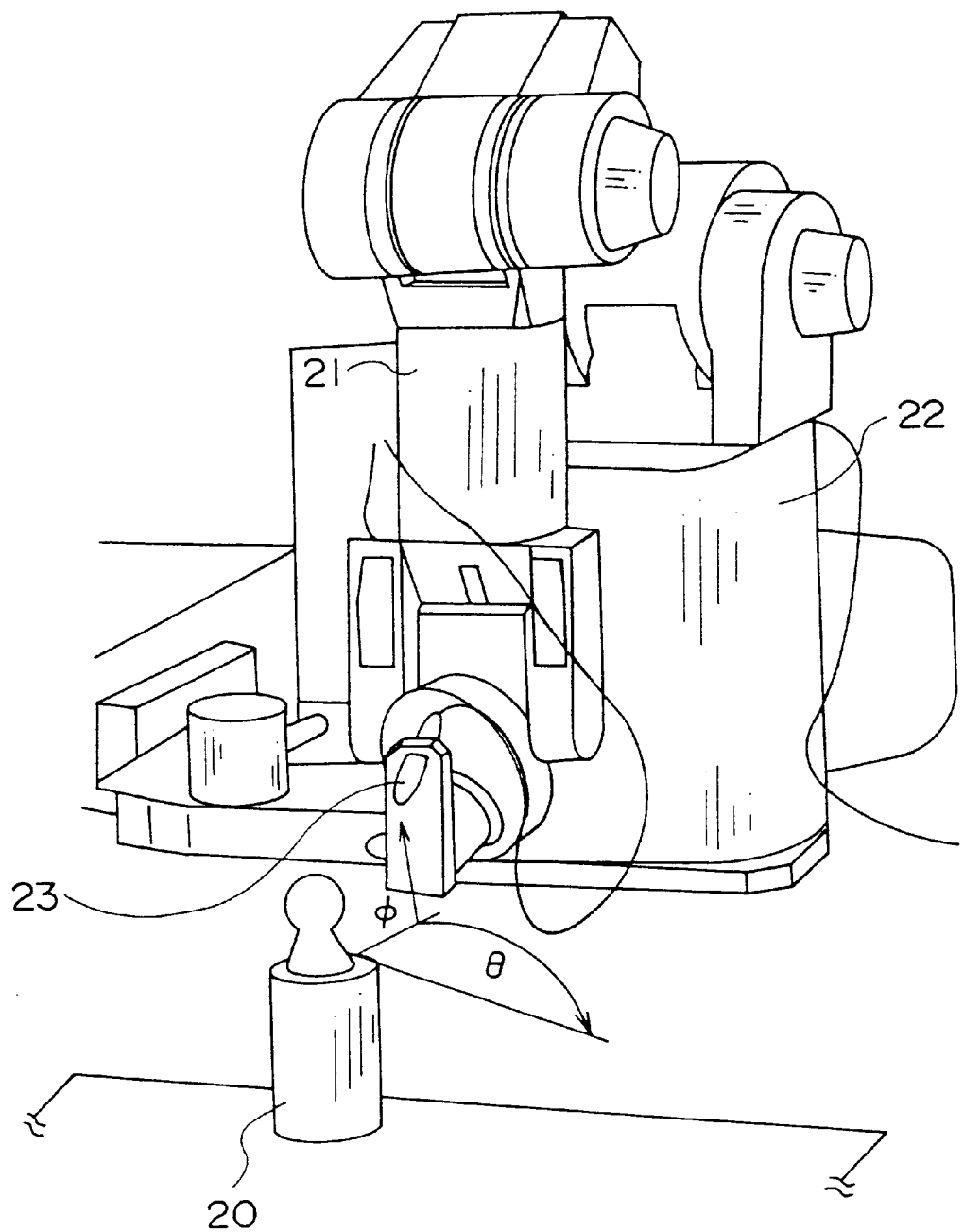
FIG. 8 is a perspective view showing the general structure of a robot.

The present inventor carried out an experiment by applying this embodiment to a robot having a robot arm with six degrees of freedom. FIG. 8 shows a perspective view of the general structure of this robot used for the experiment. In FIG. 8, the robot includes a robot arm 21 having six degrees of freedom, a controller 22 which controls actuators (not shown), and a video camera 23 provided on a tip end of the robot arm 21. The video camera 23 corresponds to the sensor 1 shown in FIG. 7, and the controller 22 includes the CPU 11, the ROM 12, the RAM 13 and the like shown in FIG. 7. Of course, it is possible to provide the controller 22 independently of the robot, and operate the robot by a remote-control operation. In FIG. 8, an object 20 is the target to be processed by the robot. In this case, the robot inputs an image of the object 20 by the video camera 23.

In the experiment, no particular restrictions were provided with respect to the illumination conditions and background. A distance r between the object 20 and the video camera 23 was changed at 10 mm intervals from 100 mm to 150 in six ways. An azimuth angle Θ of the tip end of the robot arm 21, that is, the video camera 23, was changed at 5° intervals from −30° to 30° in 13 ways. In addition, an elevation angle φ of the tip end of the robot arm 21 is changed at 5° intervals from 10° to 20° in three ways. The image of the object 20 was picked up by the video camera 23 while making the above described changes. As a result, 6×13×3=234 images were picked up.

Figure 9:
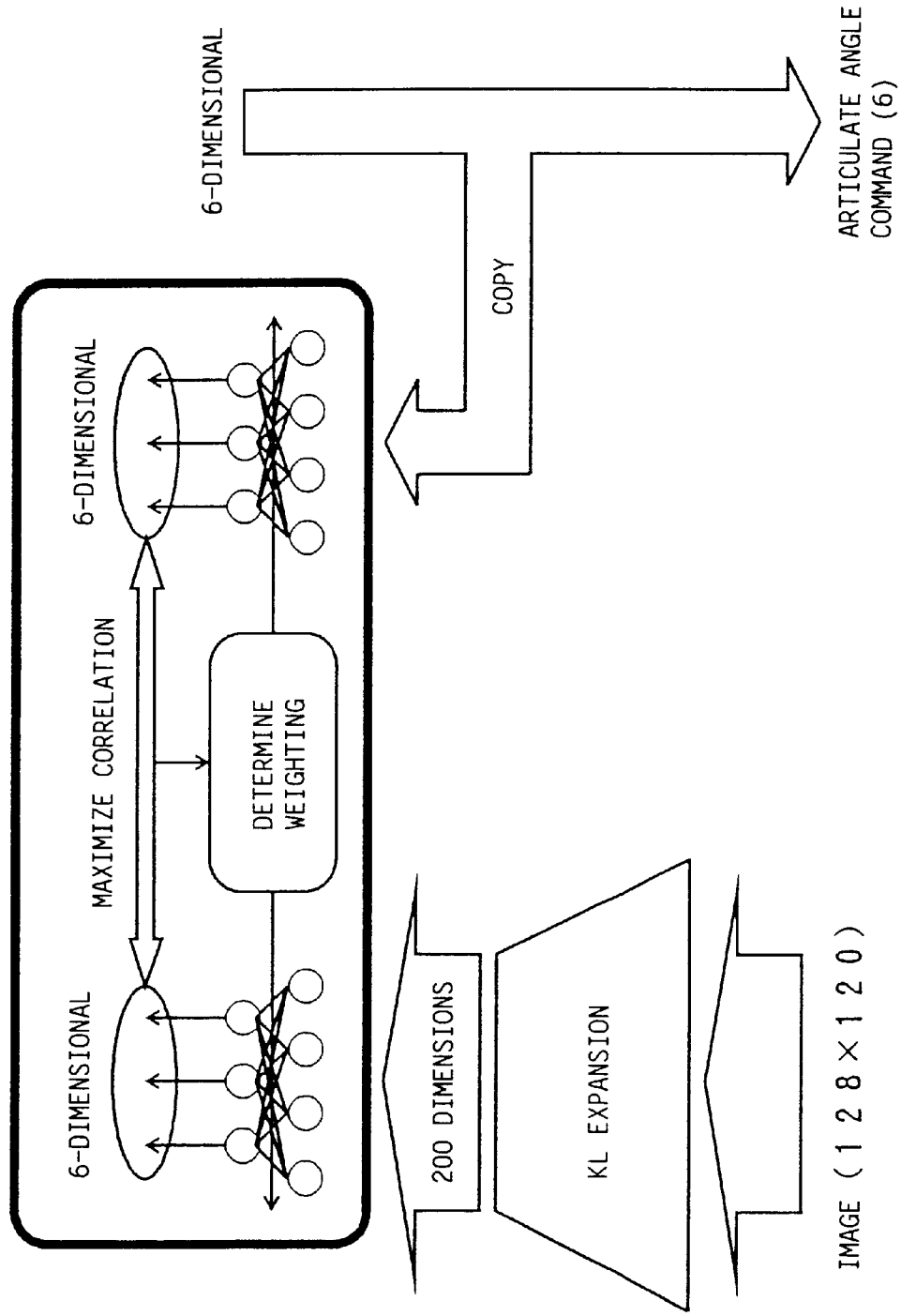
FIG. 9 is a diagram showing a recognition and control system applied with the sensory-motor fusion learning method.

With respect to the images which are picked up as described above, the sensory-motor fusion learning method was applied as shown in FIG. 9 so as to inspect the basic performance of this embodiment. When making this inspection, a recognition module which carries out the KL expansion was prepared. This recognition was designed to compress an image of 128×120 pixels to the 200 dimensions. A 2-level linear network was prepared as the network which transforms the sensory signal compressed to the 200 dimensions. A six-dimensional articulate angle command which controls the articulate angle of the robot was used as the motor signal or the motor command. A 2-level network was used as the network which transforms the motor signal or the motor command. The weighting was determined so that the correlation between the outputs of these two networks becomes a maximum, and vectors indicated by the following formulas (16) and (17) were obtained. In this case, k=l=1, and n=6. In other words, the mutual dependency relationship between the outputs of the two networks was detected as a correlation index, and the weighting was determined so that the correlation is maximized.

$$p(t)=(a^T(t-1))^T \quad (16)$$

$$f(t)=(s^T(t))^T \quad (17)$$

The results of the experiment conducted to study the structure of the internal representation space that is generated as shown in FIGS. 10 through 12.

Figure 10A:
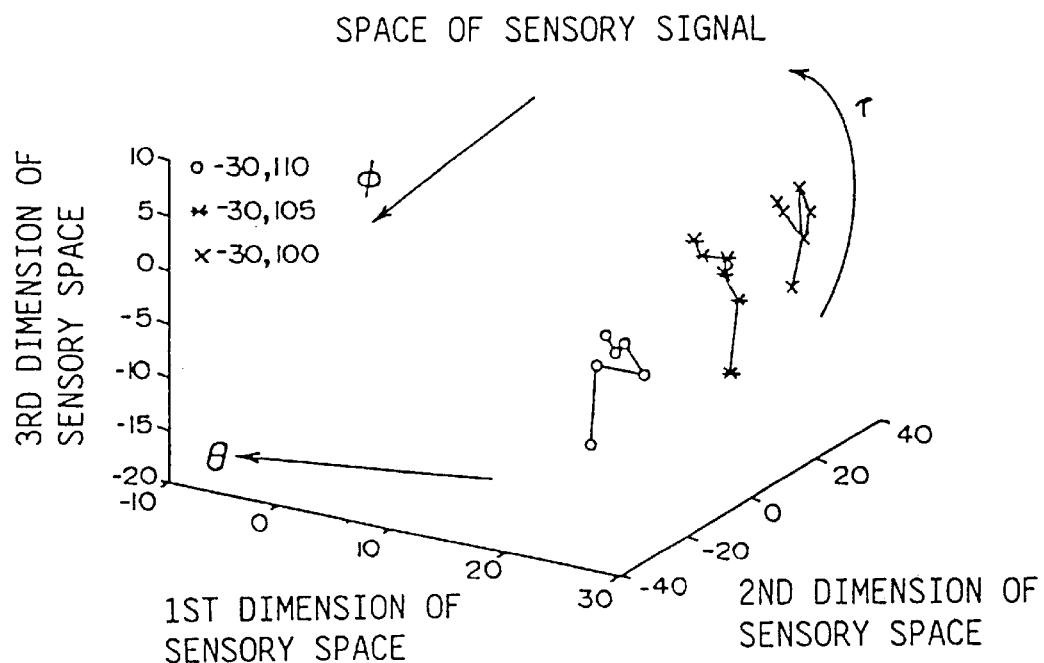
Figure 10B:
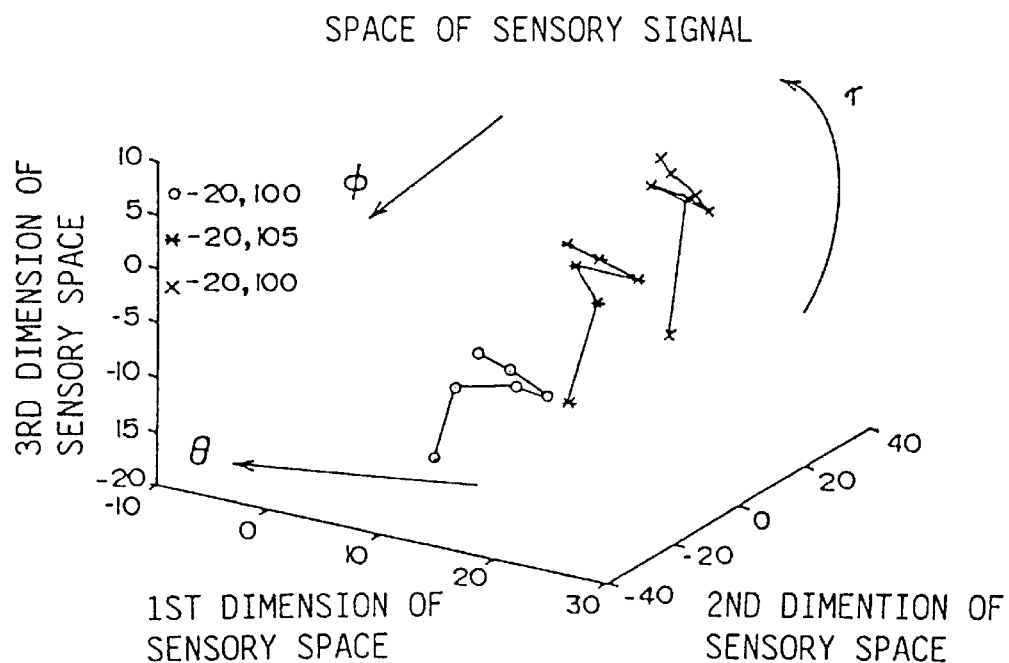

FIGS. 10A through 10C show the space of the sensory signal generated by the sensory-motor fusion learning. In FIGS. 10A through 10C, the three axes indicate the first, second and third dimensions of the 6-dimensional sensory signal, and the directions in which Θ, φ and τ change are indicate by the arrows.

In FIG. 10A, a symbol "o" indicates a case where Θ and φ respectively are −30 and 110, a symbol "*" indicates a case where Θ and φ respectively are −30 and 105, and a symbol "x" indicates a case where Θ and φ respectively are −30 and 100. In the case shown in FIG. 10A, the directions of the arrows indicating the directions in which Θ, φ and τ change are approximately perpendicular.

In FIG. 10B, a symbol "o" indicates a case where Θ and φ respectively are −20 and 110, a symbol "*" indicates a case where Θ and φ respectively are −20 and 105, and a symbol "x" indicates a case where e and φ respectively are −20 and 100. In the case shown in FIG. 10B, the directions of the arrows indicating the directions in which Θ, φ and τ change are approximately perpendicular.

In FIG. 10C, a symbol "o" indicates a case where Θ and φ respectively are −10 and 110, a symbol "*" indicates a case where Θ and φ respectively are −10 and 105, and a symbol "x" indicates a case where Θ and φ respectively are −10 and 100. In the case shown in FIG. 10C, the directions of the arrows indicating the directions in which Θ, φ and τ change are approximately perpendicular.

Figure 11A:
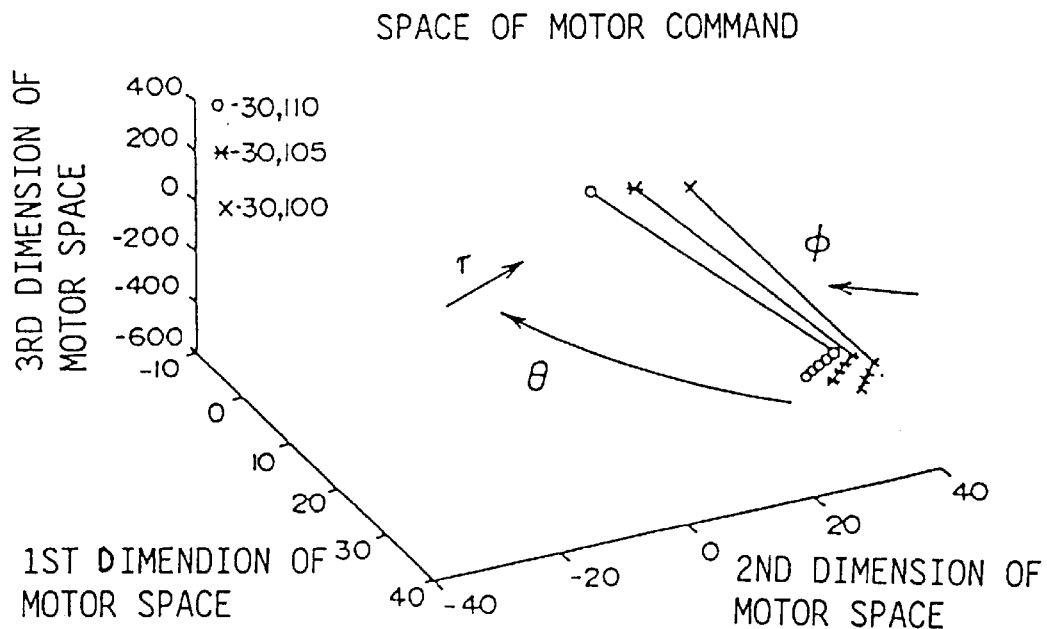
Figure 11B:
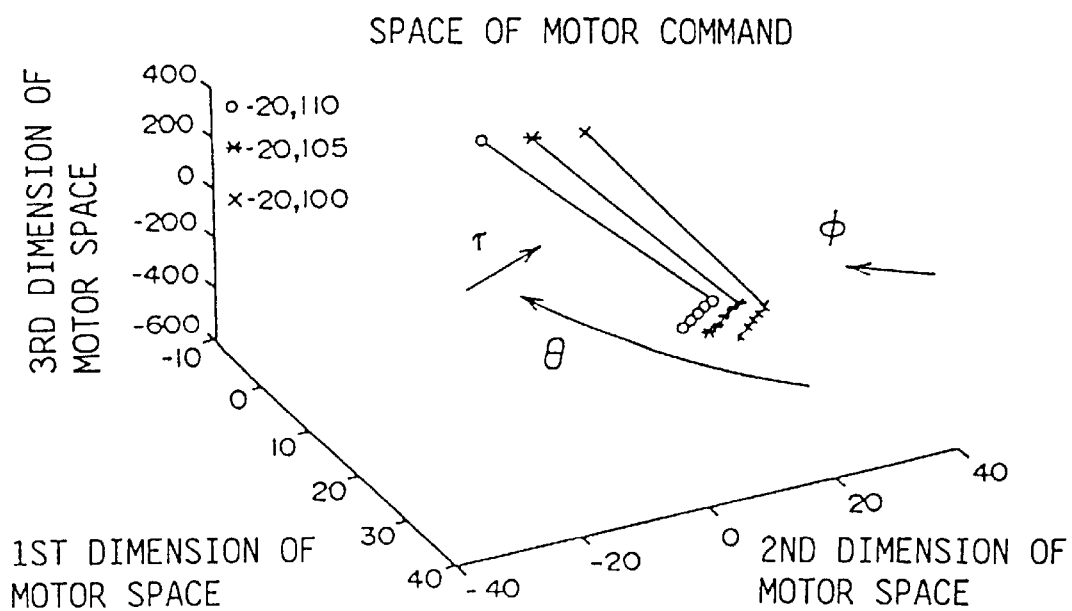

FIGS. 11A through 11C show the space of the motor signal (or motor command) generated by the sensory-motor fusion learning. In FIGS. 11A through 11C, the three axes indicate the first, second and third dimensions of the 6-dimensional sensory signal, and the directions in which Θ, φ and τ change are indicate by the arrows.

In FIG. 11A, a symbol "o" indicates a case where Θ and φ respectively are −30 and 110, a symbol "*" indicates a case where Θ and φ respectively are −30 and 105, and a symbol "x" indicates a case where e and φ respectively are −30 and 100. In the case shown in FIG. 11A, the angle formed by the arrows indicating the directions in which Θ and φ change is small.

In FIG. 11B, a symbol "o" indicates a case where Θ and φ respectively are −20 and 110, a symbol "*" indicates a case where Θ and φ respectively are −20 and 105, and a symbol "x" indicates a case where Θ and φ respectively are −20 and 100. In the case shown in FIG. 11B, the angle formed by the arrows indicating the directions in which Θ and φ change is small.

In FIG. 11C, a symbol "o" indicates a case where Θ and φ respectively are −10 and 110, a symbol "*" indicates a case where Θ and φ respectively are −10 and 105, and a symbol "x" indicates a case where Θ and φ respectively are −10 and 100. In the case shown in FIG. 11C, the angle formed by the arrows indicating the directions in which Θ and φ change is small.

Figure 12A:
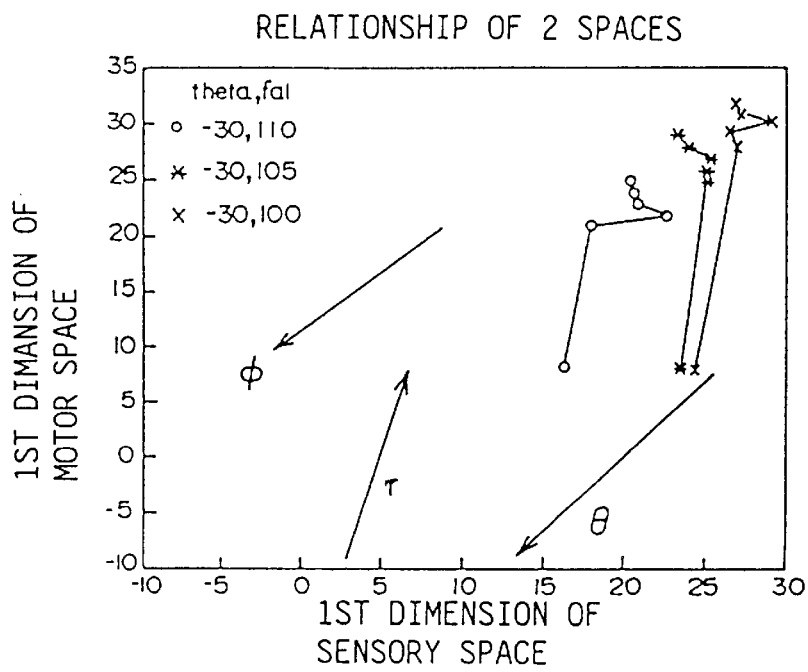
FIGS. 12A, 12B and 12C respectively are diagrams showing the relationship between the space of the sensory signal and the space of the motor signal (motor command) generated by the sensory-motor fusion learning.
Figure 12B:
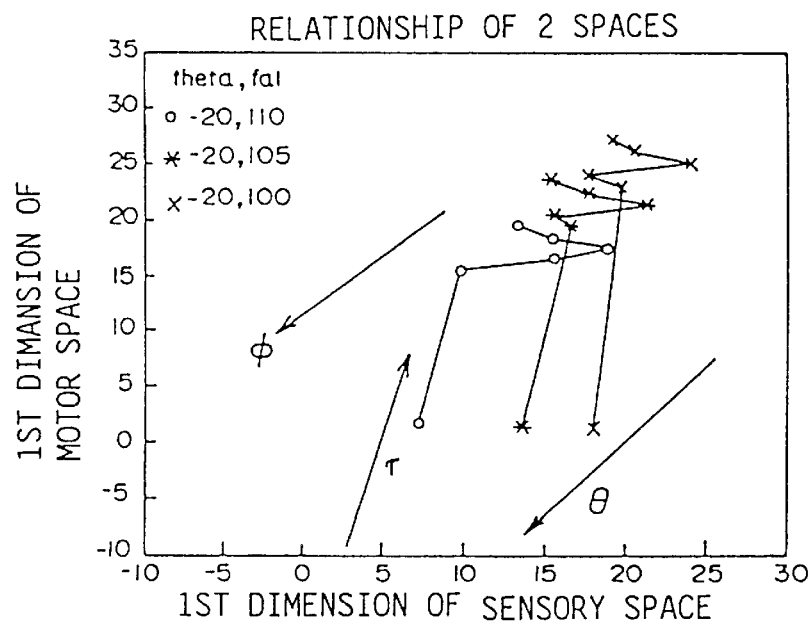
Figure 12C:
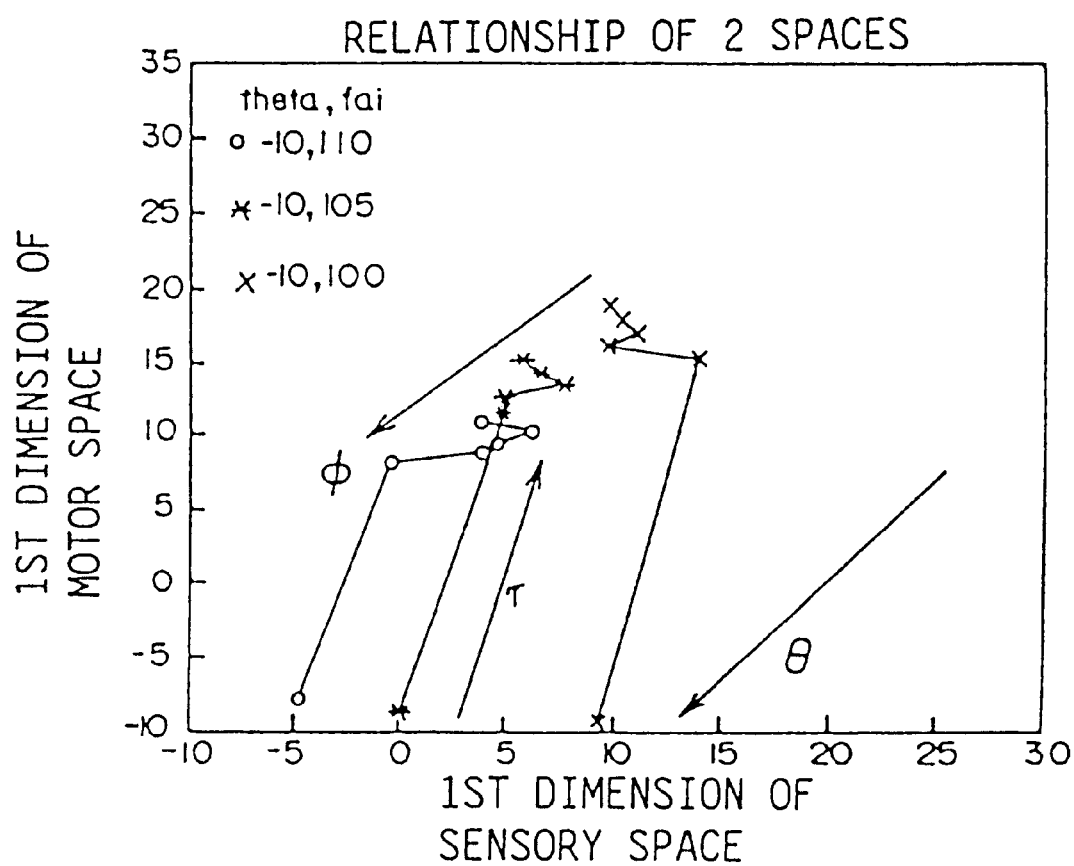

FIGS. 12A through 12C show the relationship of the space of the sensory signal and the space of the motor signal (or motor command) generated by the sensory-motor fusion learning. In FIGS. 12A through 12C, the three axes indicate the first, second and third dimensions of the 6-dimensional sensory signal, and the directions in which Θ, φ and τ change are indicate by the arrows.

In FIG. 12A, a symbol "o" indicates a case where Θ and φ respectively are −30 and 110, a symbol "*" indicates a case where Θ and φ respectively are −30 and 105, and a symbol "x" indicates a case where Θ and φ respectively are −30 and 100.

In FIG. 12B, a symbol "o" indicates a case where Θ and φ respectively are −20 and 110, a symbol "*" indicates a case where Θ and φ respectively are −20 and 105, and a symbol "x" indicates a case where Θ and φ respectively are −20 and 100.

In FIG. 12C, a symbol "o" indicates a case where Θ and φ respectively are −10 and 110, a symbol "*" indicates a case where Θ and φ respectively are −10 and 105, and a symbol "x" indicates a case where Θ and φ respectively are −10 and 100.

The following conclusions were reached from FIGS. 12A through 12C.

(1) In both the space of the sensory signal and the space of the motor signal (or motor command), the parameters Θ, φ and τ essential to the relationship between the sensory signal and the motor signal are appropriately coded.

(2) Particularly in the space of the sensory signal, the parameters Θ, φ and τ are represented in approximately perpendicular directions.

(3) From FIGS. 12A through 12C which show the relationship between the two spaces, a relationship close to a proportional relationship can be seen in the method of coding the parameters Θ, φ and τ in the space of the sensory signal and the space of the motor signal.

(4) The coding is not made independently between the two spaces, but the coding method is determined so that there is correspondence between the two spaces.

Therefore, it was found that compact internal representations satisfactorily representing the mutual dependency relationship between the sensory signal and the motor signal can be generated automatically according to the sensory-motor fusion learning method.

In addition, the present inventor made a study of the extent to which the mutual dependency relationship between the compressed image and the particular angle command is represented, with respect to the following three kinds of compressed images.

(A) Standard Data: Compressed images which are obtained by compressing each of the 234 images to 200 dimensions using the KL expansion, without taking into account the relationship between each image and the motor signal.

(B) KL Expansion: Compressed images which are obtained by compressing each of the 234 images to 6 dimensions using the KL expansion, without taking into account the relationship between each image and the motor signal.

(C) This Embodiment: Images which are obtained by compressing the 200-dimensional standard data to 6 dimensions using the sensory-motor fusion learning method, by taking into account the relationship between the 200-dimensional standard data and the motor signal.

Figure 13:
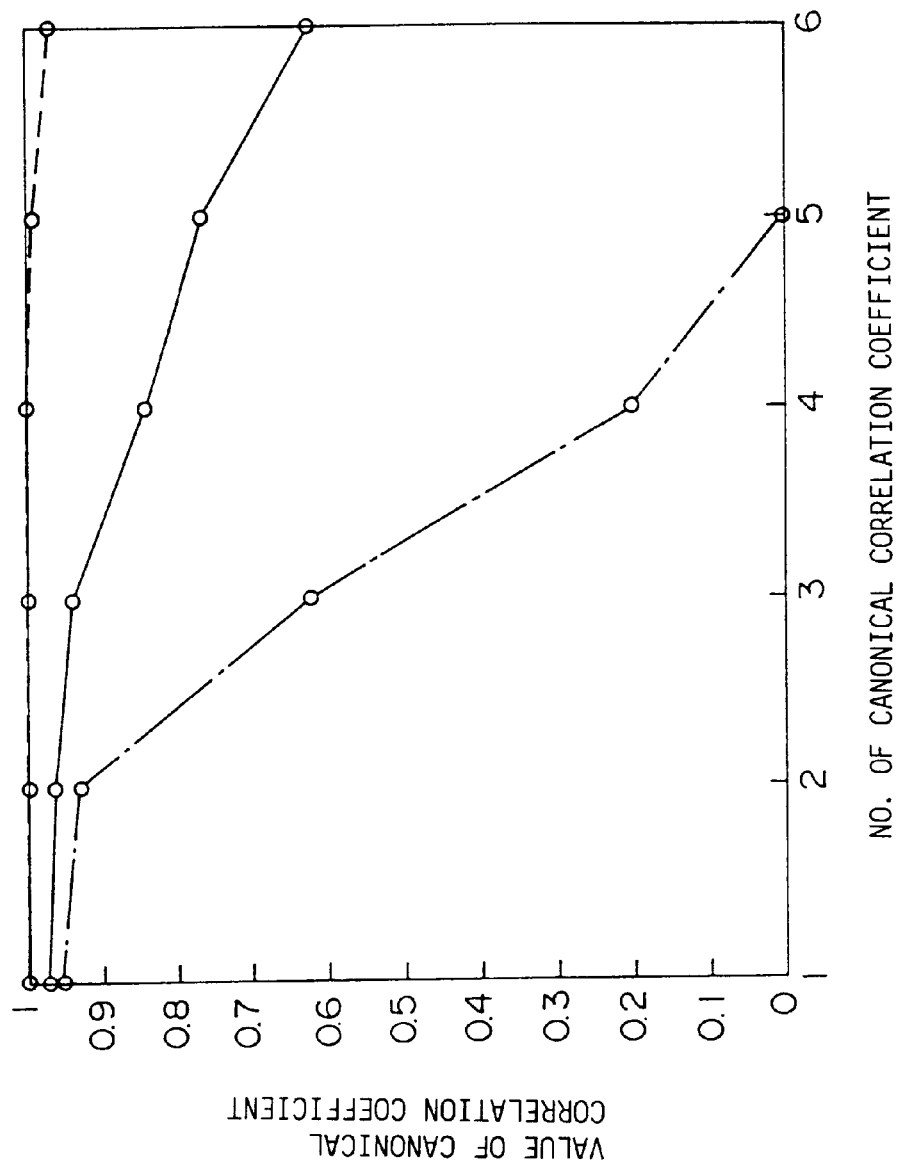
FIG. 13 is a diagram showing the relationship between a number of canonical correlation coefficients and values of the canonical correlation coefficients.

The following Table shows the generalized coefficient of determination with respect to the three kinds of compressed images described above. The generalized coefficient of determination is a measure indicating the strength or depth of the relationship between two data groups, and takes a value between "0" and "1". FIG. 13 shows measured results of the relationship between the compressed image and the articulate angle command using the generalized coefficient of determination. FIG. 13 shows the relationship between the number of canonical correlation coefficients and the values of the canonical correlation coefficients with respect to the three kinds of compressed images described above. In FIG. 13, (A) the standard data is indicated by a broken line, (B) the KL expansion is indicated by a one-dot chain line, and (C) this embodiment is indicated by a solid line.

TABLE

|  | Generalized Coefficient of Determination |
| --- | --- |
| Standard Data 200 Dimensions | 0.994 |
| KL Expansion 6 Dimensions | 0.454 |
| This Embodiment 6 Dimensions | 0.854 |

As may be seen from the Table above, the generalized coefficient of determination is 0.994 which is approximately 1 for (A) the standard data, and is 0.454 and small for (B) the KL expansion.

However, according to (C) this embodiment, the generalized coefficient of determination is 0.854 and is maintained to this large value even though the compression is made to 6 dimensions as in the case of (B) the KL expansion.

In other words, it was confirmed that, according to this embodiment, it is possible to generate compact internal representations which satisfactorily maintains the mutual dependency relationship between the sensory signal and the motor signal, as compared to the case where the KL expansion is used.

Figures 14A, 14B, 14C:
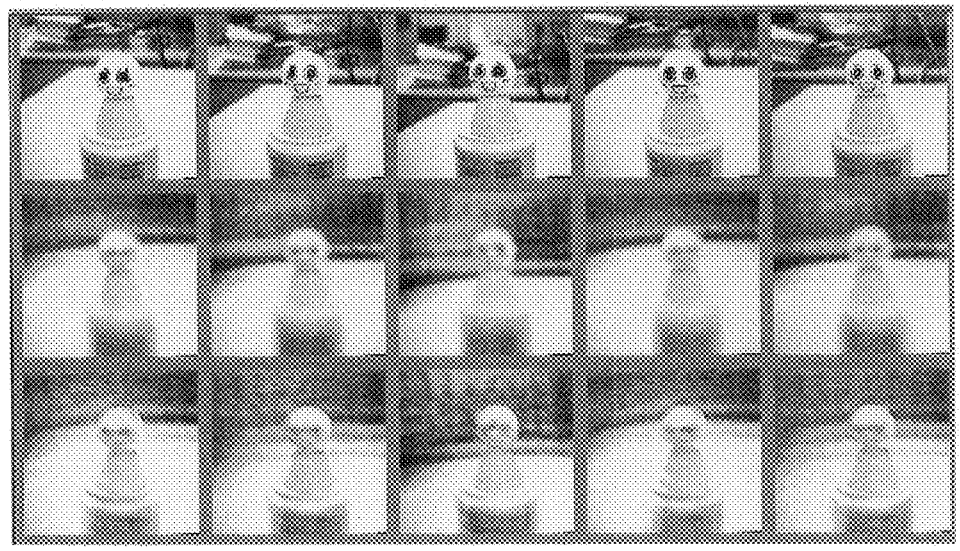
FIGS. 14A, 14B and 14C respectively are diagrams showing an original image and restored images obtained according to the KL expansion and the embodiment.

As described above, it was confirmed quantitatively that this embodiment can generate compact representations satisfactorily maintaining the mutual dependency relationship between the sensory signal and the motor signal as compared to the method using the KL expansion. Next, in order to facilitate intiutive understanding of this embodiment, the original image and the restored images obtained by (B) the KL expansion and (C) this embodiment are shown in FIGS. 14A through 14C. In FIGS. 14A through 14C, it is assumed for the sake of convenience that the target picked up by the video camera is a moving object made up of a can and a figure placed on the can.

FIG. 14A shows the original image made up of 128×120 pixels. FIG. 14B shows the restored image which is obtained by compressing the image to 6 dimensions by (B) the KL expansion and then restoring the compressed image. FIG. 14C shows the restored image which is obtained by compressing the image to 6 dimensions by (C) this embodiment and then restoring the compressed image. As may be seen by comparing FIGS. 14A and 14B, the restored image derived from the image compressed by (B) the KL expansion only represent the general impression of the entire image when compared to the original image. Compared to the original image shown in FIG. 14A, the figure appears smaller than the actual size of the original image and the contour of the can is blurred and very unclear in FIG. 14B.

On the other hand, as may be seen by comparing FIG. 14C with FIGS. 14A and 14B, the restored image derived from the image compressed by (C) this embodiment is slightly blurred compared to the original image shown in FIG. 14A, however, the size of the figure is accurate and the contour of the can is relatively clear when compared to FIG. 14B. According to this embodiment, it is possible to clearly see the shape of a projecting upper portion of the can in FIG. 14C.

Therefore, it was also confirmed from FIGS. 14A through 14C that this embodiment is capable of generating compact representations satisfactorily maintaining the mutual dependency relationship between the sensory signal and the motor signal, as compared to the method using the KL expansion. In other words, this embodiment can extract from the sensory signal the characteristics which are affected when the target object moves, and generate the representations of the extracted characteristics, that is, generate the internal representations.

Because of the nature of the algorithm, the sensory-motor fusion learning method of this embodiment, as in the case of the method using the KL expansion, obtains the dimensions of the output so that they are perpendicular, that is, so that no correlation exists among them. For this reason, if it is assumed that the dimensions of the output are perfectly perpendicular, it is possible to restore the original image by approximation by multiplying the output value to the eigen image corresponding to each dimension and obtaining a sum total for all of the dimensions. In other words, the original image can be restored by approximating an inverse transformation.

Next, the present inventor studied the effects of adding a motor signal or a motor command which does not affect the sensory signal. More particularly, an experiment was conducted by adding 10 random motor signals which conform to a regular distribution in the recognition and control system shown in FIG. 9, and the weighting was determined.

Figure 15:
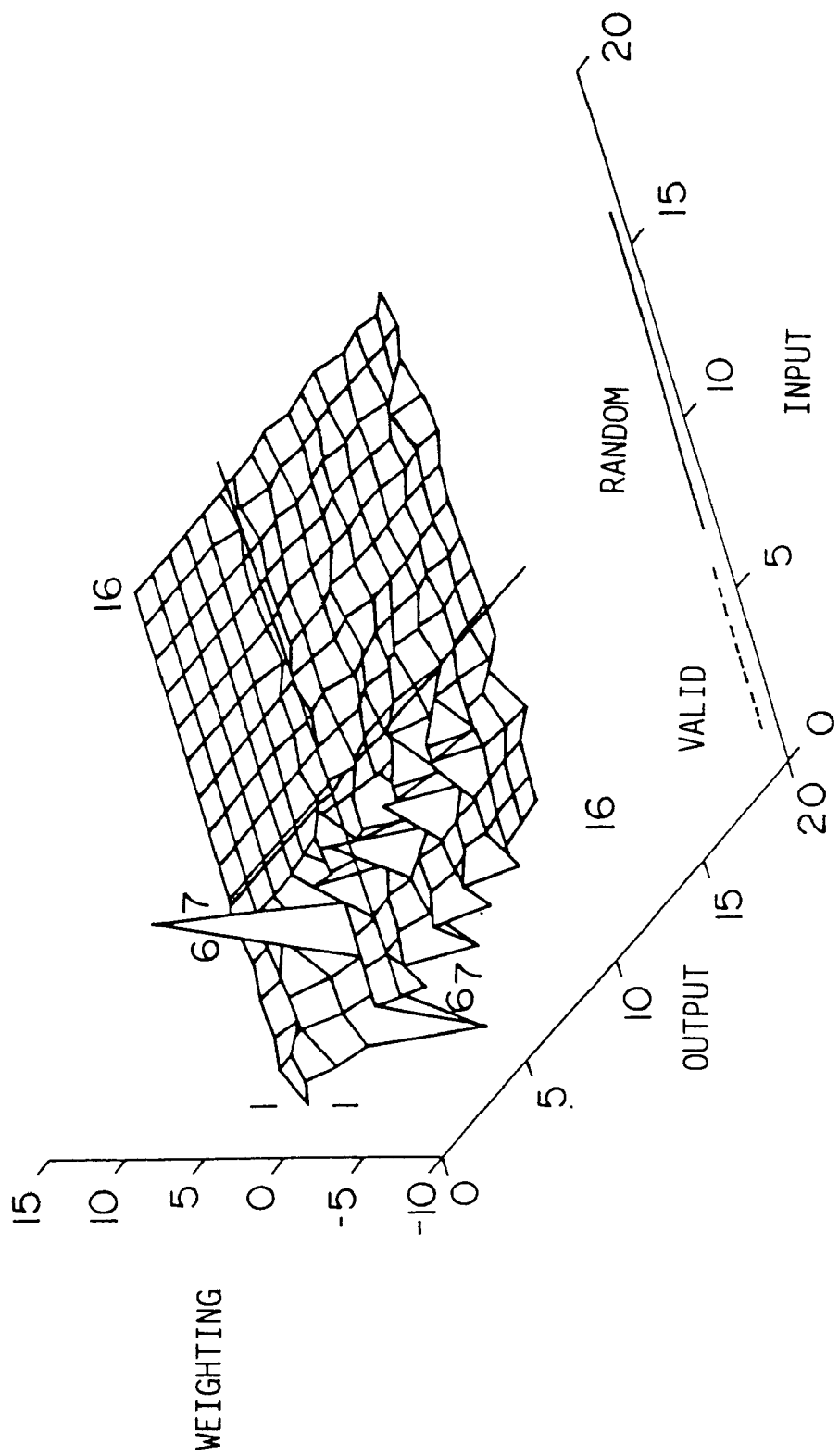
FIG. 15 is a diagram showing results of an experiment in which 10 random motor signals conforming to a regular distribution are added and weights are determined by carrying out the experiment in the recognition and control system.

FIG. 15 shows the results of this experiment. In FIG. 15, input axes 1 through 16 correspond to each of the dimensions of the input, and output axes 1 through 16 correspond to each of the dimensions of the output. The height of the input and output (input, output) represents the weighting from the input to the output. In FIG. 15, 1 through 6 indicate motor signals affecting the sensory signal, and 7 through 10 indicate random motor signals.

The following conclusions were reached and confirmed from FIG. 15.

[1] A region shown on the right side of FIG. 15 where the input is 7 to 16 and the output is 1 to 6, which represents the effects of the random motor signal on the output, is a plane having a height of approximately 0.

[2] A region shown on the left side of FIG. 15 where the input is 1 1o 6 and the output is 1 to 16, which represents the effects of the motor signals (input of 1 to 6) that affects the sensory signal on the output, has a height with a large absolute value.

[3] Particularly a region shown on the top left of FIG. 15 where the input is 1 to 6 and the output is 1 to 16, has a height with a large absolute value.

Accordingly, it was confirmed that the motor signal affecting the sensory signal is satisfactorily represented by the first 6 outputs. In addition, according to this embodiment, it was also confirmed that it is possible to distinguish the motor signal related to the change in the sensory signal and the motor signal unrelated to the change in the sensory signal.

Further, the present invention is not limited to these embodiments, but various variations and modifications may be made without departing from the scope of the present invention.

What is claimed is:

1. An apparatus for automatically generating internal representations in a recognition and control system for actively varying a state of a subject, such as an object and a related environment, to be processed by the recognition and control system, a state of the recognition and control system itself, or a relationship between the subject and the recognition and control system, said apparatus comprising:

sensor means for detecting a state of the recognition and control system and outputting a sensor signal;

actuator means for varying the state of the recognition and control system in response to a control signal;

a sensory module processing the sensor signal from said sensor means and outputting a sensory signal;

a motor module outputting the control signal which controls said actuator means, based on a motor signal or a motor command; and an automatic adjusting module analyzing a mutual dependency relationship between the sensor signal and the control signal, based on the sensory signal from said sensory module and the control signal from said motor modules to obtain analysis results, and automatically adjusting sensory characteristics of said sensory module and motor characteristic of said motor module, based on the analysis results, so that sensory information and motor information which are internal representations of the sensor signal and the control signal are automatically generated.

2. The apparatus for automatically generating internal representations as claimed in claim 1, wherein said actuator means includes means for varying characteristic parameters of said sensor means and for actively (varies) varying the state of the subject to be processed by the recognition and control system, the state of the recognition and control system itself, or the relationship between the subject and the recognition and control system.

3. The apparatus for automatically generating internal representations as claimed in claim 1, wherein said sensor means includes an element selected from a group consisting of a position sensor, a velocity sensor, a temperature sensor, a humidity sensor, an illumination sensor and a camera.

4. The apparatus for automatically generating internal representations as claimed in claim 3, which further comprises:

a robot arm having said camera provided on a tip end thereof; and said actuator means controls at least one of a focal distance, a lens stop and a resolution of said camera.

5. The apparatus for automatically generating internal representations as claimed in claim 1, wherein at least one of said sensory module and said motor module includes linear transformation means for carrying out a linear transformation on a signal input thereto.

6. The apparatus for automatically generating internal representations as claimed in claim 1, wherein said automatic adjusting module includes means for detecting a mutual dependency relationship between the sensory signal and the control signal as a correlation index.

7. A computer-implemented method of automatically generating internal representations in a recognition and control system which actively varies a state of a subject, such as an object and a related environment, to be processed by the recognition and control system, a state of the recognition and control system itself, or a relationship between the subject and the recognition and control system, said method comprising the steps of:

(a) detecting a state of the recognition and control system and outputting a sensor signal;

(b) varying the state of the recognition and control system in response to a control signal;

(c) processing the sensor signal and outputting a sensory signal;

(d) producing and outputting the control signal, which controls an actuator, based on a motor signal or a motor command; and (e) analyzing a mutual dependency relationship between the sensor signal and the control signal, based on the sensory signal and the control signal, to obtain analysis results and automatically adjusting sensory characteristics of said step (c) and motor characteristics of said step (d), based on the analysis results, so that sensory information and motor information, which are internal representations of the sensor signal and the control signal, are automatically generated.

8. The method of automatically generating internal representations as claimed in claim 7, wherein said step (b) includes varying characteristic parameters of said step (a), and actively varies the state of the subject to be processed by the recognition and control system, the state of the recognition and control system itself or, the relationship between the subject and the recognition and control system.

9. The method of automatically generating internal representations as claimed in claim 7, wherein said step (a) uses at least one element selected from a group consisting of a position sensor, a velocity sensor, a temperature sensor, a humidity sensor, an illumination sensor and a camera.

10. The method of automatically generating internal representations as claimed in claim 9, wherein said recognition and control system comprises a robot arm having said camera provided on a tip end thereof, and said step (b) controls at least one of a focal distance, a lens stop and a resolution of said camera.

11. The method of automatically generating internal representations as claimed in claim 7, wherein at least one of said steps (c) and (d) carries out a linear transformation.

12. The method of automatically generating internal representations as claimed in claim 7, wherein said step (e) further comprises detecting a mutual dependency relationship between the sensory signal and the control signal as a correlation index.

13. An apparatus automatically generating internal representations in a recognition and control system for actively varying a state of a subject, such as an object and a related environment, to be processed by the recognition and control system, a state of the recognition and control system itself, or a relationship between the subject and the recognition and control system, said apparatus comprising:

a sensor detecting a state of the recognition and control system and outputting a sensor signal;

an actuator varying the state of the recognition and control system in response to a control signal;

a sensory module processing the sensor signal from said sensor means and outputting a sensory signal;

a motor module outputting the control signal which controls said actuator, based on a motor signal or a motor command; and an automatic adjusting module analyzing a mutual dependency relationship between the sensor signal and the control signal, based on the sensory signal from said sensory module and the control signal from said motor module, to obtain analysis results, and automatically adjusting sensory characteristics of said sensory module and motor characteristics of said motor module, based on the analysis results, so that sensory information and motor information, which are internal representations of the sensor signal and the control signal, are automatically generated.

14. The apparatus automatically generating internal representations as claimed in claim 13, wherein said actuator includes an adjuster varying characteristic parameters of said sensor, and actively varying the state of the subject to be processed by the recognition and control system, the state of the recognition and control system itself, or the relationship between the subject and the recognition and control system.

15. The apparatus automatically generating internal representations as claimed in claim 13, wherein said sensor comprises an element selected from a group consisting of a position sensor, a velocity sensor, a temperature sensor, a humidity sensor, an illumination sensor and a camera.

16. The apparatus automatically generating internal representations as claimed in claim 15, which further comprises:

a robot arm having said camera provided on a tip end thereof; and said actuator controls at least one of a focal distance, a lens stop and a resolution of said camera.

17. The apparatus automatically generating internal representations as claimed in claim 13, wherein at least one of said sensory module and said motor module includes a linear transformation processor.

18. The apparatus for automatically generating internal representations as claimed in claim 13, wherein said automatic adjusting module includes a detector detecting a mutual dependency relationship between the sensory signal and the control signal as a correlation index.

* * * * *